(12) United States Patent
Hsu et al.

(10) Patent No.: US 11,624,949 B2
(45) Date of Patent: Apr. 11, 2023

(54) DISPLAY DEVICE

(71) Applicant: Au Optronics Corporation, Hsinchu (TW)

(72) Inventors: Chia-Chun Hsu, Hsinchu (TW); Yu-Ping Kuo, Hsinchu (TW); Hsiao-Wei Cheng, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/513,920

(22) Filed: Oct. 29, 2021

(65) Prior Publication Data

US 2023/0066690 A1 Mar. 2, 2023

(30) Foreign Application Priority Data

Aug. 19, 2021 (TW) ................. 110130691

(51) Int. Cl.
*G02F 1/1335* (2006.01)
*G02F 1/13363* (2006.01)

(52) U.S. Cl.
CPC .. *G02F 1/133553* (2013.01); *G02F 1/133531* (2021.01); *G02F 1/133638* (2021.01); *G02F 2203/02* (2013.01); *G02F 2413/02* (2013.01); *G02F 2413/05* (2013.01)

(58) Field of Classification Search
None
See application file for complete search history.

(56) References Cited

U.S. PATENT DOCUMENTS

| 6,714,276 | B2 * | 3/2004 | Towler | G02F 1/1395 |
| | | | | 349/169 |
| 2009/0015736 | A1 * | 1/2009 | Weller | B60R 1/12 |
| | | | | 362/494 |
| 2009/0296190 | A1 * | 12/2009 | Anderson | G02F 1/155 |
| | | | | 156/60 |
| 2014/0375905 | A1 * | 12/2014 | Chang | G02B 30/28 |
| | | | | 445/24 |
| 2018/0114821 | A1 * | 4/2018 | Park | H01L 27/3248 |
| 2018/0120625 | A1 * | 5/2018 | Chen | G02F 1/133512 |
| 2020/0326588 | A1 * | 10/2020 | Nian | H01L 27/3211 |

* cited by examiner

*Primary Examiner* — Ryan Crockett
(74) *Attorney, Agent, or Firm* — JCIPRNET

(57) ABSTRACT

A display device including a display area and a non-display area is provided. The display area includes a display panel, a switch unit and a first reflective film. The non-display area includes a second reflective film. The switch unit is disposed on the display panel. The first reflective film is disposed between the display panel and the switch unit. When the display device is set in a pattern mode, the display panel does not emit image light. For the pattern mode, the reflectivity in the display area is approximately equal to the reflectivity in the non-display area for ambient light.

11 Claims, 5 Drawing Sheets

DISPLAY DEVICE

CROSS-REFERENCE TO RELATED APPLICATION

This application claims the priority benefit of Taiwanese application no. 110130691, filed on Aug. 19, 2021. The entirety of the above-mentioned patent application is hereby incorporated by reference herein and made a part of this specification.

BACKGROUND

Technical Field

The disclosure relates to a display device.

Description of Related Art

In recent years, as the display technology advances, the technology of the immersive experience is also making great progress. In a space of an immersive experience, a display device is equipped with a display area and a non-display area. For a favorable immersive experience, the display area and the non-display area have to be blended together without a boundary therebetween. To realize a display mode (the display area is turned on to display an image) and a pattern mode (the display area is turned off and does not display the image) in the display area, a switch unit is configured to switch between the two modes. However, that leads to a difference between a reflectivity in the display area and a reflectivity in the non-display area, which makes the display area and the non-display area unable to be blended together and fail to achieve the favorable immersive experience.

SUMMARY

The disclosure is directed to a display device in which a reflectivity in a display area for ambient light is approximately equal to a reflectivity in a non-display area for the ambient light and the display area and the non-display area are blended together to provide a favorable immersive experience.

According to an embodiment of the disclosure, a display device including a display area and a non-display area is provided. The display area includes a display panel, a switch unit, and a first reflective film. The non-display area includes a second reflective film. The switch unit is disposed on the display panel. The first reflective film is disposed between the display panel and the switch unit. When the display device is set in a pattern mode, the display panel does not emit image light. In the pattern mode, a reflectivity in the display area for ambient light is approximately equal to a reflectivity in the non-display area for the ambient light.

Based on the above, in the display device provided in the embodiment of the disclosure, the first reflective film is disposed in the display area, and the second reflective film is disposed in the non-display area. A reflectivity of the first reflective film for the ambient light is greater than a reflectivity of the second reflective film for the ambient light. Hence, the reflectivity in the display area for the ambient light is approximately equal to the reflectivity in the non-display area for the ambient light, and the display area and the non-display area are blended together to provide the favorable immersive experience.

In order to make the aforementioned features and advantages of the disclosure comprehensible, embodiments accompanied with drawings are described in detail below.

DESCRIPTION OF THE EMBODIMENTS

Figure 1:
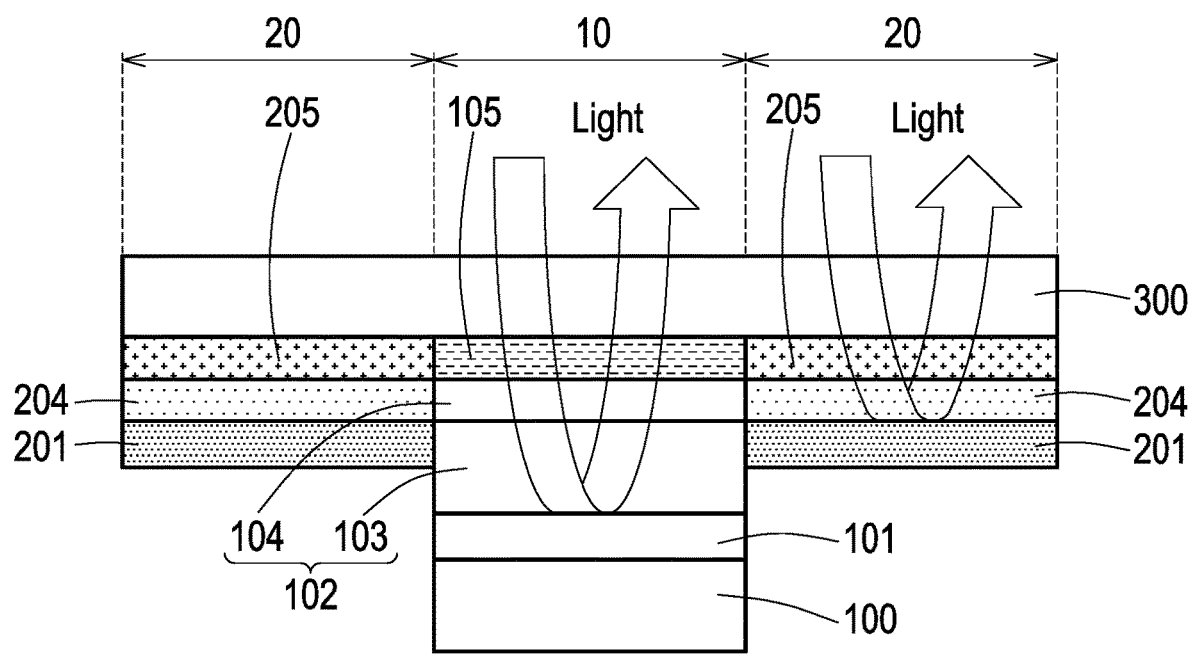
FIG. 1 is a schematic diagram of a display device according to an embodiment of the disclosure.

Referring to FIG. 1, FIG. 1 is a schematic diagram of a display device according to an embodiment of the disclosure. A display device 1 includes a display area 10 and a non-display area 20. The display area 10 includes a display panel 100, a switch unit 102 and a first reflective film 101. The non-display area 20 includes a second reflective film 201. The switch unit 102 is disposed on the display panel 100. The first reflective film 101 is disposed between the display panel 100 and the switch unit 102.

In the embodiment, the switch unit 102 is formed by a liquid crystal layer 103 and a first polarizer 104, and the liquid crystal layer 103 is disposed between the first polarizer 104 and the first reflective film 101. The display device 1 further includes a second polarizer 204, a first optical adhesive 105, a second optical adhesive 205, and a cover glass 300. The cover glass 300 is disposed on the display area 10 and the non-display area 20. The first optical adhesive 105 is disposed to adhere the first polarizer 104 and the cover glass 300 in the display area 10. The second optical adhesive 205 is disposed to adhere the second polarizer 204 and the cover glass 300 in the non-display area 20.

In a pattern mode (the display panel 100 is turned off and does not display an image), the display panel 100 does not emit image light, and a user may see the first reflective film 101 and the second reflective film 201. With regard to an immersive experience, the display device 1 has to be configured to make the display area 10 and the non-display area 20 viewed by the user blended together without a boundary therebetween. That is, the first reflective film 101 and the second reflective film 201 viewed by the user exhibit the same sense of vision (the same color or an uninterrupted pattern) without being viewed as two different parts.

As shown in FIG. 1, to realize a display mode (the display panel 100 is turned on to display the image) and the pattern mode in the display area 10, the switch unit 102 is configured to switch between the two modes in the display device 1. However, with the switch unit 102, after ambient light is incident on the display device 1, the ambient light is partially absorbed and partially reflected. Considering that the ambient light is partially absorbed and partially reflected, a reflectivity of the first reflective film 101 has to be greater than a reflectivity of the second reflective film 201. Hence, in the pattern mode, a reflectivity in the display area 10 for the ambient light is approximately equal to a reflectivity in the non-display area 20 for the ambient light, and the display area 10 and the non-display area 20 viewed by the user are blended together without the boundary therebetween.

Referring to FIG. 1, compared to the non-display area 20 without the liquid crystal layer 103, the ambient light incident on the display device 1 from the display area 10 has to further pass through the liquid crystal layer 103, be reflected by the first reflective film 101, and then pass through the liquid crystal layer 103. To cause the reflectivity in the display area 10 for the ambient light to be approximately equal to the reflectivity in the non-display area 20 for the ambient light, a ratio of the reflectivity of the first reflective film 101 to the reflectivity of the second reflective film 201 is $1:T^2$, and T is a transmittance of the liquid crystal layer 103 of the switch unit 102.

Figure 2A:
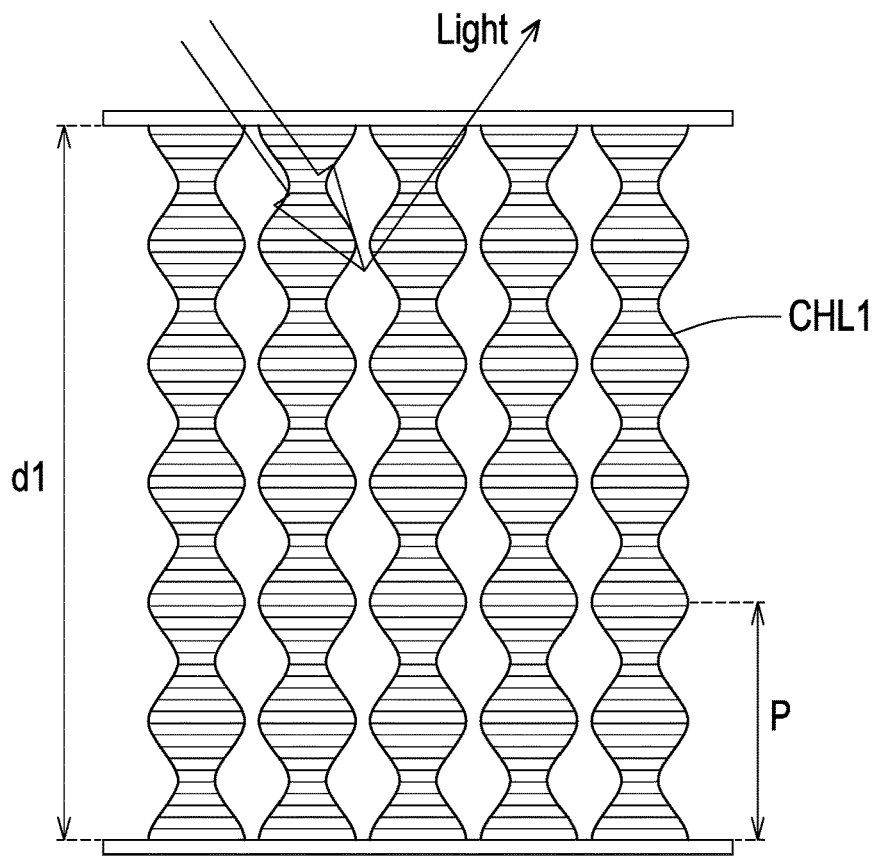
FIG. 2A and FIG. 2B are respectively schematic diagrams of a first cholesteric liquid crystal layer and a second cholesteric liquid crystal layer according to an embodiment of the disclosure.
Figure 2B:
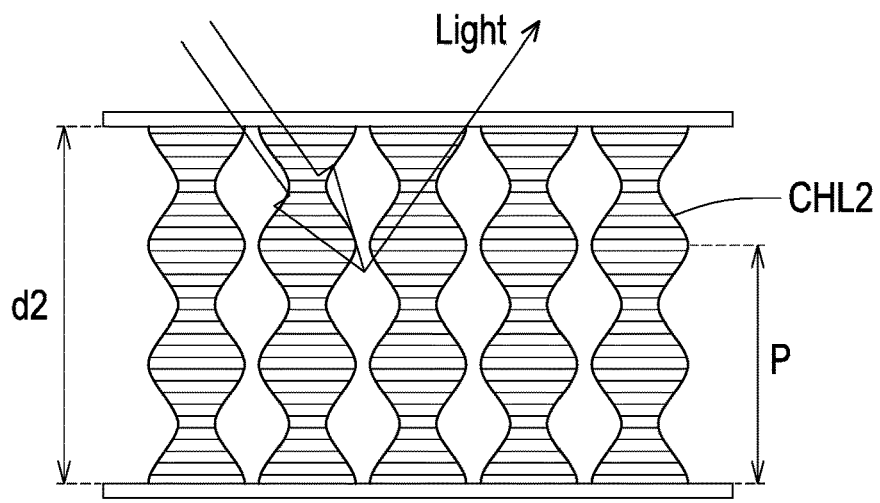

Referring to FIG. 1, FIG. 2A, and FIG. 2B together, in an embodiment of the disclosure, the first reflective film 101 includes a first cholesteric liquid crystal layer CHL1, and the second reflective film 201 includes a second cholesteric liquid crystal layer CHL2. A ratio d1/P of a film thickness d1 of the first cholesteric liquid crystal layer CHL1 to a pitch P of a cholesteric liquid crystal in the first cholesteric liquid crystal layer CHL1 is greater than a ratio d2/P of a film thickness d2 of the second cholesteric liquid crystal layer CHL2 to the pitch P of a cholesteric liquid crystal in the second cholesteric liquid crystal layer CHL2. That is, d1/P>d2/P.

Specifically, the greater a ratio of a film thickness of a cholesteric liquid crystal layer to a pitch of a cholesteric liquid crystal is, the higher a reflectivity is. According to a simulation result of the disclosure, when a circularly polarized light is incident on the cholesteric liquid crystal layer with the pitch P of 0.36 um, a correlation of the above ratio and the maximum reflectivity is shown in Table 1 below.

TABLE 1

| d/P | 5 | 7 | 9 | 11 | 13 | 15 |
|---|---|---|---|---|---|---|
| d (um) | 1.80 | 2.52 | 3.24 | 3.96 | 4.68 | 5.40 |
| Maximum reflectivity | 58.5% | 77.7% | 87.9% | 92.7% | 94.7% | 95.6% |

According to an embodiment of the disclosure, the ratio d1/P of the first cholesteric liquid crystal layer CHL1 and the ratio d2/P of the second cholesteric liquid crystal layer CHL2 satisfy the equation: d1/P:d2/P=13:7. Accordingly, a ratio of a reflectivity of the first cholesteric liquid crystal layer CHL1 to a reflectivity of the second cholesteric liquid crystal layer CHL2 is approximately 100:81.

In the simulation shown in Table 1, a light wave band reflected by the cholesteric liquid crystal layer corresponds to green light (a peak value corresponds to 550 nm). However, the disclosure is not limited thereto. In some embodiments of the disclosure, optimization may also be performed on a color image so that the reflectivity in the display area 10 for the ambient light is approximately equal to the reflectivity in the non-display area 20 for the ambient light. That is, the first reflective film 101 and the second reflective film 201 in FIG. 1 may be color films.

According to an embodiment of the disclosure that is not illustrated, the first reflective film 101 and the second reflective film 201 are color films. When the circularly polarized light is incident on the first cholesteric liquid crystal layer CHL1 and the second cholesteric liquid crystal layer CHL2 with different film thicknesses, a correlation of the ratio d/P of the thickness d of the cholesteric liquid crystal layer to the pitch P and the maximum reflectivity is shown in the Table 2 below.

TABLE 2

| | First cholesteric liquid crystal layer CHL1 | | | Second cholesteric liquid crystal layer CHL2 | | |
|---|---|---|---|---|---|---|
| Color | Blue | Green | Red | Blue | Green | Red |
| d/P | | 15 | | | 7 | |
| P (um) | 0.29 | 0.36 | 0.42 | 0.29 | 0.36 | 0.42 |
| d (um) | 4.35 | 5.40 | 6.30 | 2.03 | 2.52 | 2.94 |
| Maximum reflectivity (normalization) | | 100% | | | 81% | |

Figure 3A:
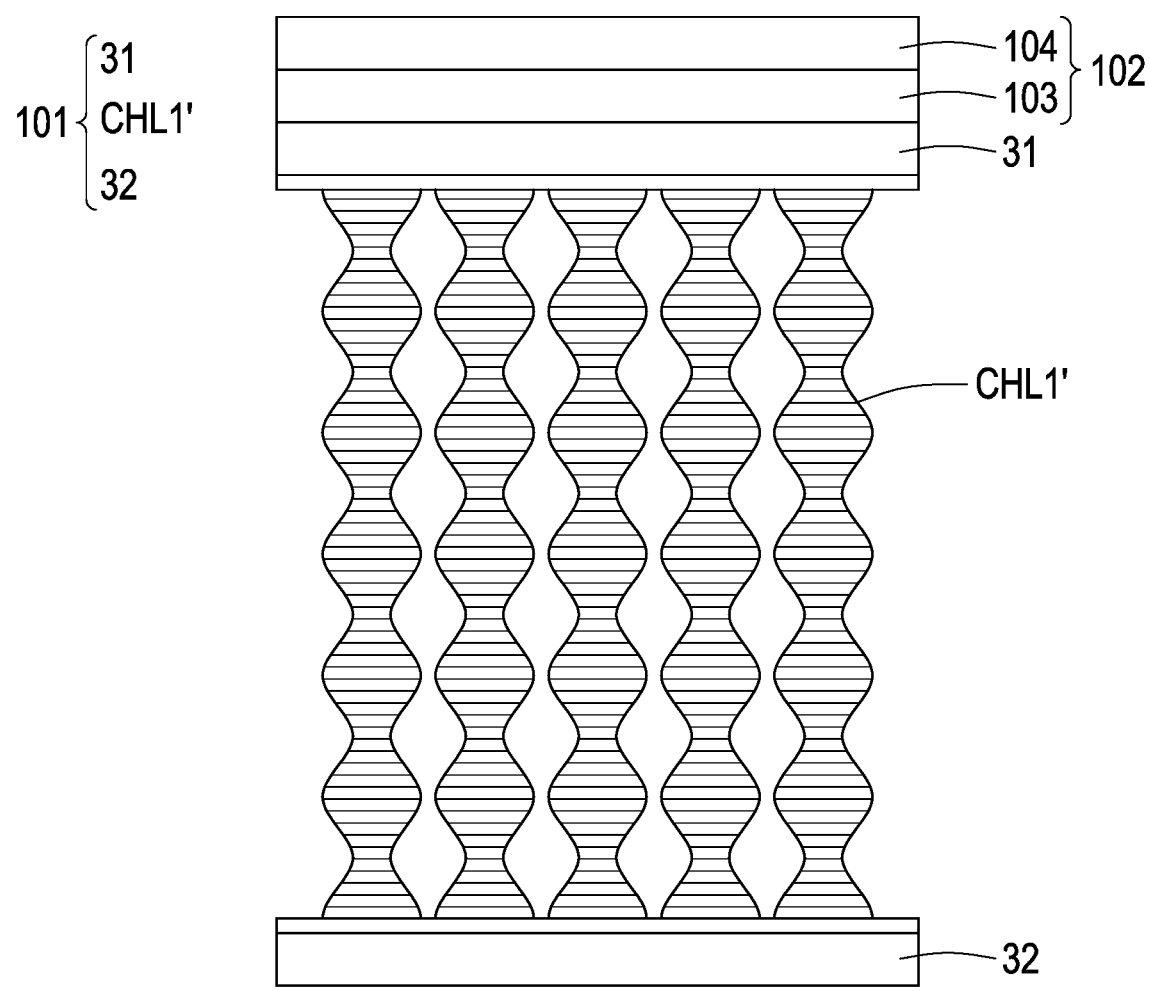
FIG. 3A is a schematic diagram of a switch unit and a first reflective film according to an embodiment of the disclosure.
Figure 3B:
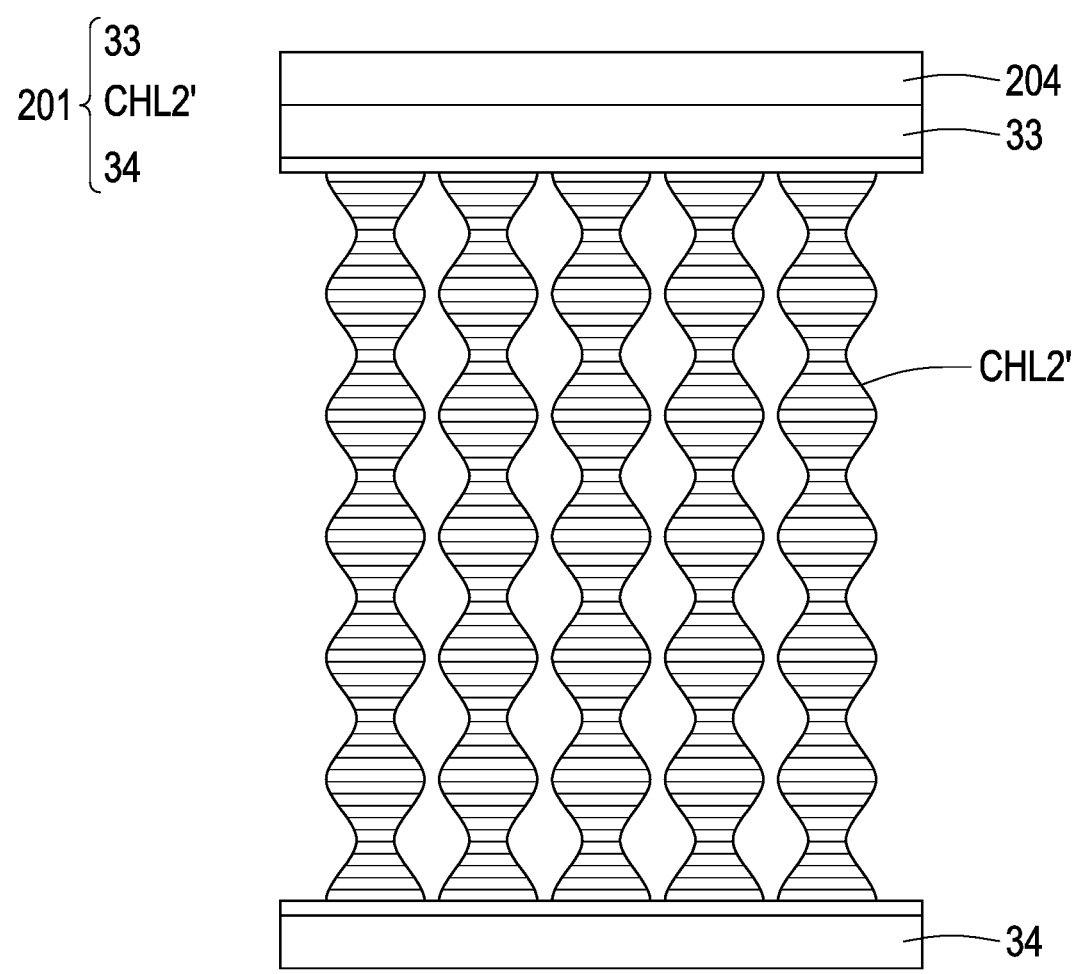
FIG. 3B is a schematic diagram of a second polarizer and a second reflective film according to an embodiment of the disclosure.

Referring to FIG. 1, FIG. 3A, and FIG. 3B, according to an embodiment of the disclosure, the first reflective film 101 includes a first cholesteric liquid crystal layer CHL1', a first quarter wave plate 31, and a second quarter wave plate 32. A slow axis of the first quarter wave plate 31 and a slow axis of the second quarter wave plate 32 are orthogonal to each other. The first cholesteric liquid crystal layer CHL1' is disposed between the first quarter wave plate 31 and the second quarter wave plate 32. The second reflective film 201 includes a second cholesteric liquid crystal layer CHL2', a third quarter wave plate 33, and a fourth quarter wave plate 34. A slow axis of the third quarter wave plate 33 and a slow axis of the fourth quarter wave plate 34 are orthogonal to each other. The second cholesteric liquid crystal layer CHL2' is disposed between the third quarter wave plate 33 and the fourth quarter wave plate 34. The third quarter wave plate 33 is disposed between the second cholesteric liquid crystal layer CHL2' and the second polarizer 204.

In the embodiment, a film thickness of the first cholesteric liquid crystal layer CHL1' is approximately the same as a film thickness of the second cholesteric liquid crystal layer CHL2'. In other words, in the embodiment, the reflectivity of the reflective film is not controlled through the film thickness of the cholesteric liquid crystal layer thereof as the embodiments above. In the embodiment, the reflectivity of the reflective film changes according to a relative arrangement relation of an upper quarter wave plate of the reflective film (with regard to the first reflective film 101, the upper quarter wave plate is the first quarter wave plate 31; with regard to the second reflective film 201, the upper quarter wave plate is the third quarter wave plate 33) and a polarizer of the upper quarter wave plate (with regard to the first reflective film 101 and the second reflective film 201, the polarizer is respectively the first polarizer 104 and the second polarizer 204).

According to a simulation result of the embodiment, when an included angle θ of a slow axis of the upper quarter wave plate of the reflective film and an absorption axis of the polarizer on the upper quarter wave plate is different, a reflectivity R of the reflective film is different, which is illustrated in Table 3 below.

TABLE 3

| Included angle θ (degree) | 45 | 40 | 35 | 30 | 25 | 20 | 15 |
|---|---|---|---|---|---|---|---|
| Reflectivity R (normalization) | 100% | 100% | 99% | 97% | 93% | 88% | 82% |

When the included angle θ of the slow axis of the upper quarter wave plate of the reflective film and the absorption axis of the polarizer on the upper quarter wave plate is 45 degrees, the reflectivity R of the reflective film is the highest. When the included angle θ of the slow axis of the upper quarter wave plate of the reflective film and the absorption axis of the polarizer on the upper quarter wave plate is less than 45 degrees, the reflectivity R of the reflective film decreases. Referring to FIG. 3A and FIG. 3B again, according to an embodiment of the disclosure, an included angle of the slow axis of the first quarter wave plate 31 of the first reflective film 101 and an absorption axis of the first polarizer 104 is 45 degrees, and an included angle of the slow axis of the third quarter wave plate 33 of the second reflective film 201 and an absorption axis of the second polarizer 204 is less than 45 degrees. Accordingly, the reflectivity of the first reflective film 101 is greater than the reflectivity of the second reflective film 201 so that the reflectivity in the display area 10 for the ambient light is approximately equal to the reflectivity in the non-display area 20 for the ambient light.

Figure 4:
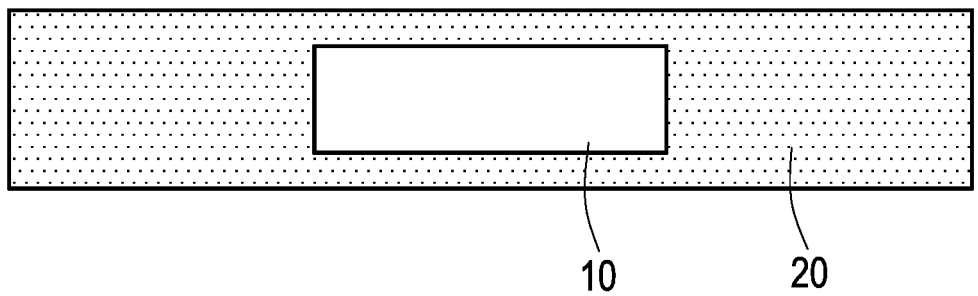
FIG. 4 is a schematic diagram of a cover glass according to an embodiment of the disclosure.

Referring to FIG. 1 and FIG. 4 together, FIG. 4 is a schematic diagram of a cover glass according to an embodiment of the disclosure. The cover glass 300 is disposed on the display area 10 and the non-display area 20. In the embodiment, as shown in FIG. 4, a transmittance of a part of the cover glass 300 on the display area 10 is greater than a transmittance of a part of the cover glass 300 on the non-display area 20 so that the reflectivity in the display area 10 for the ambient light is approximately equal to the reflectivity in the non-display area 20 for the ambient light.

In summary the above, in the display device provided in the embodiments of the disclosure, the first reflective film is disposed in the display area, and the second reflective film is disposed in the non-display area. The reflectivity of the first reflective film for the ambient light is greater than the reflectivity of the second reflective film for the ambient light. Hence, the reflectivity in the display area for the ambient light is approximately equal to the reflectivity in the non-display area for the ambient light, and the display area and the non-display area are blended together to provide the favorable immersive experience.

What is claimed is:

1. A display device, comprising:
   a display area, comprising:
      a display panel;
      a switch unit disposed on the display panel; and
      a first reflective film disposed between the display panel and the switch unit; and
   a non-display area comprising a second reflective film,
   wherein in response to the display device being set in a pattern mode, the display panel does not emit image light, and, in the pattern mode, a reflectivity in the display area for ambient light is approximately equal to a reflectivity in the non-display area for the ambient light,
   wherein the first reflective film comprises a first cholesteric liquid crystal layer, and the second reflective film comprises a second cholesteric liquid crystal layer.

2. The display device according to claim 1, wherein a reflectivity of the first reflective film is greater than a reflectivity of the second reflective film.

3. The display device according to claim 2, wherein the first reflective film and the second reflective film are color films, the first reflective film comprises the first cholesteric liquid crystal layer, the second reflective film comprises the second cholesteric liquid crystal layer, and a ratio of a film thickness of the first cholesteric liquid crystal layer to a pitch of a cholesteric liquid crystal in the first cholesteric liquid crystal layer is greater than a ratio of a film thickness of the second cholesteric liquid crystal layer to a pitch of a cholesteric liquid crystal in the second cholesteric liquid crystal layer.

4. The display device according to claim 1, wherein a ratio of a film thickness of the first cholesteric liquid crystal layer to a pitch of a cholesteric liquid crystal in the first cholesteric liquid crystal layer is greater than a ratio of a film thickness of the second cholesteric liquid crystal layer to a pitch of a cholesteric liquid crystal in the second cholesteric liquid crystal layer.

5. The display device according to claim 1, wherein the switch unit is formed by a liquid crystal layer and a first polarizer, and the liquid crystal layer is disposed between the first polarizer and the first reflective film.

6. The display device according to claim 5, further comprising a second polarizer, wherein the first reflective film further comprises a first quarter wave plate and a second quarter wave plate, a slow axis of the first quarter wave plate and a slow axis of the second quarter wave plate are orthogonal to each other, the first cholesteric liquid crystal layer is disposed between the first quarter wave plate and the second quarter wave plate, the second reflective film further comprises a third quarter wave plate and a fourth quarter wave plate, a slow axis of the third quarter wave plate and a slow axis of the fourth quarter wave plate are orthogonal to each other, the second cholesteric liquid crystal layer is disposed between the third quarter wave plate and the fourth quarter wave plate, and the third quarter wave plate is disposed between the second cholesteric liquid crystal layer and the second polarizer.

7. The display device according to claim 6, wherein an included angle of the slow axis of the first quarter wave plate and an absorption axis of the first polarizer is 45 degrees.

8. The display device according to claim 7, wherein an included angle of the slow axis of the third quarter wave plate and an absorption axis of the second polarizer is less than 45 degrees.

9. The display device according to claim 5, wherein a ratio of the reflectivity of the first reflective film and the reflectivity of the second reflective film is $1:T^2$, and T is a transmittance of the liquid crystal layer of the switch unit.

10. The display device according to claim 1, further comprising a cover glass disposed on the display area and the non-display area.

11. The display device according to claim 10, wherein a transmittance of a part of the cover glass on the display area is greater than a transmittance of a part of the cover glass on the non-display area.

* * * * *